United States Patent
Baba et al.

(10) Patent No.: US 7,277,211 B2
(45) Date of Patent: Oct. 2, 2007

(54) HOLOGRAM RECORDING AND REPRODUCTION APPARATUS, HOLOGRAM RECORDING AND REPRODUCTION METHOD AND HOLOGRAM RECORDING MEDIUM

(75) Inventors: Shigeyuki Baba, Tokyo (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 249 days.

(21) Appl. No.: 10/944,937

(22) Filed: Sep. 21, 2004

(65) Prior Publication Data

US 2005/0122551 A1 Jun. 9, 2005

(30) Foreign Application Priority Data

Sep. 24, 2003 (JP) ............................. 2003-331518

(51) Int. Cl.
*G03H 1/28* (2006.01)
(52) U.S. Cl. ..................... 359/24; 359/25; 369/103; 365/125; 365/216
(58) Field of Classification Search ................. 359/24, 359/25, 35; 369/103; 365/125, 216
See application file for complete search history.

(56) References Cited

U.S. PATENT DOCUMENTS

| | | | |
|---|---|---|---|
| 4,149,269 A * | 4/1979 | Abe et al. ..................... 365/215 |
| 6,064,586 A | 5/2000 | Snyder et al. |
| 6,888,785 B2 * | 5/2005 | Morrison ..................... 369/103 |

FOREIGN PATENT DOCUMENTS

| | | |
|---|---|---|
| WO | WO99/57719 | 11/1999 |
| WO | WO 01/29835 A1 | 4/2001 |
| WO | WO 01/57859 A2 | 8/2001 |

OTHER PUBLICATIONS

R. Deml, et al., "Large Optical Memories: Some Practical Considerations", Annual Meeting of the Optical Society of America, XP-001208357, 1971, p. 19.

* cited by examiner

*Primary Examiner*—Leonidas Boutsikaris
(74) *Attorney, Agent, or Firm*—Oblon, Spivak, McClelland, Maier & Neustadt, P.C.

(57) ABSTRACT

An apparatus and method is disclosed wherein, even if the multiplicity in multiplexing of recording data is increased, positioning of data upon reproduction can be performed with a high degree of accuracy without decreasing the recording capacity. Interference fringes generated by interference of a light beam spatially optically modulated by a spatial light modulator on which a marker data page is displayed with reference light are recorded at a recording spot on a hologram recording medium. Similarly, interference fringes corresponding to recording data page are recorded at another recording spot on the hologram recording medium. The multiplicity of such marker data pages upon recording is set to a value with which recognition of markers upon reproduction can be performed with a high degree of accuracy so that, even if the multiplicity of the data pages is raised, positioning information of high accuracy can be obtained. Consequently, positioning of data included in the data page can be performed with a high degree of accuracy, and reproduction data of high quality can be obtained.

8 Claims, 10 Drawing Sheets

HOLOGRAM RECORDING AND REPRODUCTION APPARATUS, HOLOGRAM RECORDING AND REPRODUCTION METHOD AND HOLOGRAM RECORDING MEDIUM

BACKGROUND OF THE INVENTION

This invention relates to a hologram recording and reproduction apparatus, a hologram recording and reproduction method and a hologram recording medium, and more particularly to recording and reproduction of positioning information of data when data is reproduced from a recording medium.

In recent years, a holographic technique has been and is being developed rapidly to place a holographic memory, which attracts attention as a candidate to a strong storage which competes with next-generation or second next-generation optical disks, into practical use. Thus, a hologram recording and reproduction system which makes use of the hologram technique to achieve recording and reproduction of a large amount of data has been proposed in IBM J.RES DEVELOP VOL. 44 NO. 3 May 2000 "Holographic data storage"; U.S. Pat. No. 6,281,993 issued Aug. 28, 2001 to Bernal et al. The contents of All the reference herein are incorporated by reference herein.

In the hologram storage recording and reproduction system, a coherent laser beam is split into signal light and reference light, and the signal light is strength modulated in accordance with recording data by a spatial light modulator (SLM). The modulated signal light is condensed on a hologram recording medium. Thereupon, also the reference light is illuminated upon the hologram recording medium. Consequently, the signal light and the reference light interfere with each other, and interference fringes formed as a result of the interference are recorded as a fine density pattern on the recording medium.

In order to reproduce the data recorded on the hologram recording medium, illumination light same as the reference light is introduced at the same angle as that of the reference light to the hologram recording medium. Thereupon, the data are reproduced as diffracted light corresponding to the interference fringes recorded on the hologram recording medium, and the diffracted light is condensed on an image pickup element such as a CCD image pickup element or a MOS image pickup element and is fetched as a bit pattern by the image pickup element. A received light signal obtained by the image pickup element is analyzed and reproduced as data.

Incidentally, the storage capacity of a holographic memory depends upon the volume recording density while the storage capacity of an optical disk depends upon the plane recording density. When data are recorded holographically, recording marks are not recorded directly on the hologram recording medium, but interference fringes of signal light and reference light are recorded. Therefore, it is possible also to allocate data of 1 Mbyte to one hologram spot (data page). If the volume of the hologram recording medium is utilized to repeat such multiple recording of a data page, then a large storage capacity exceeding several hundreds Gbytes can be achieved. As representative multiple systems, an angle multiple system, a shift multiple system, a wavelength multiple system, a phase modulation multiple system and so forth are available.

Figure 10:
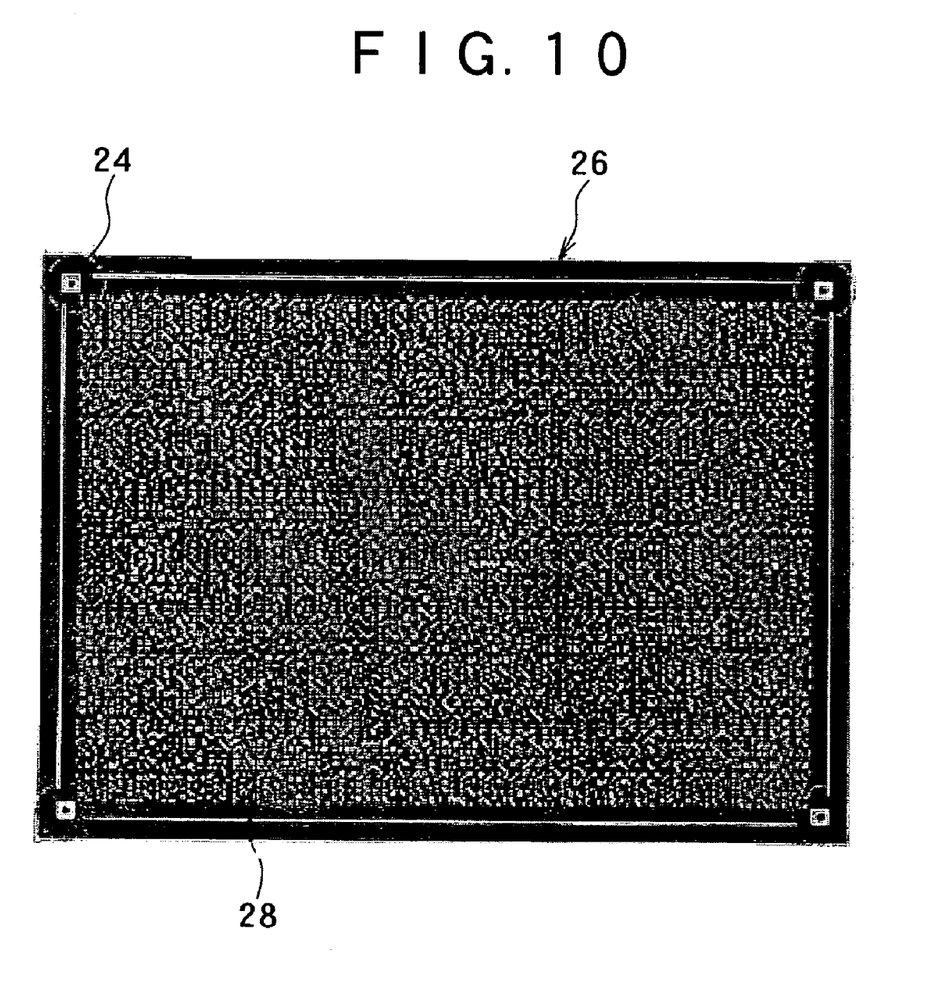
FIG. 10 is a view showing an example of a recording data page to which the present invention can be applied.

For recording and reproduction of such hologram storage as described above, a marker for positioning is recorded in a page same as that of a two-dimensional bit pattern. FIG. 10 shows an example of a recording data page invented by the inventor of the present patent application. Referring to FIG. 10, the data page 26 includes a bit pattern 28 representative of data and markers 24 provided at outer peripheral portions thereof for positioning the bit pattern 28 upon reproduction.

Incidentally, diffracted light which corresponds to a light beam emitted from a pixel at a certain position of a spatial light modulator (that is, reflected light of reproduction reference light from a holographic memory) is not sometimes introduced correctly to a light receiving pixel on an image pickup element set so as to receive a light beam from the pixel at the position of the spatial light modulator. In order that an original input signal may be reproduced accurately in such an instance as just described, markers 24 for positioning a reproduction bit pattern obtained from the image pickup element are inserted in the data page 26.

Accordingly, the markers 24 are detected from an image picked up by the image pickup element, and the position of the bit pattern 28 is determined based on positioning information obtained from the markers 24. Then, reading out of the bit pattern 28 is performed.

Although the positioning accuracy of the bit pattern 28 is improved by raising the recognition rate of the markers 24, in order to raise the recognition rate of the markers 24, it is necessary for the markers 24 to have a certain magnitude. Further, while, in the example of FIG. 10, four markers 24 are disposed individually at the four corners, for example, where the distortion of an image is great, it is necessary to dispose several additional markers over the overall image.

Figure 11:
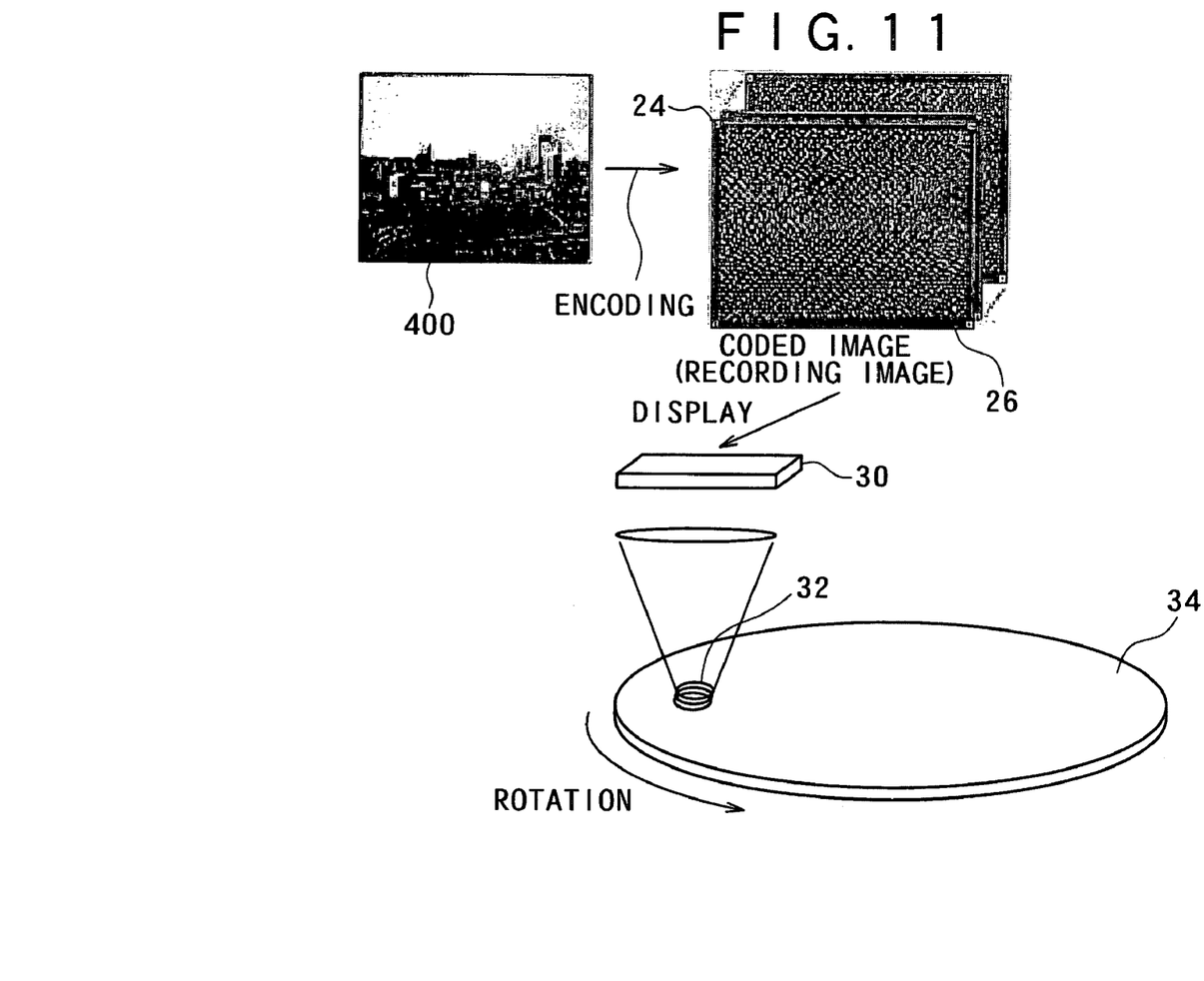
FIG. 11 is a schematic view illustrating a hologram recording method to which the present invention can be applied.

Recording of such a coded image (data page 26) produced by encoding image data 400 to be recorded as illustrated in FIG. 11 is performed in the following manner. In particular, where the shift multiplex system is used, for example, as seen in FIG. 11, data pages 26 are successively displayed on a spatial light modulator 30 to spatially optically modulate signal light. Then, interference fringes of the modulated signal light and reference light are recorded at a hologram recording spot (hereinafter referred to merely as recording spot) 32 of a hologram recording medium 34. Thereupon, the hologram recording medium 34 is moved by a very small pitch (since the hologram recording medium 34 is shown as a disk-type medium in FIG. 11, it is rotated in the direction indicated by an arrow mark so that a plurality of data pages 26 are written in an overlapping relationship at the recording spot 32 to effect shift multiplex recording.

Again, in such a data page 26 of a hologram storage as described above, while four markers 24 are disposed one by one at the four corners, for example, where the distortion of an image is great, it is necessary to dispose several additional markers over the overall image. However, if the number of markers increases, then the region to which a bit pattern 28 is to be allocated decreases, and therefore, the recording capacity per one page decreases. Further, where multiplexing of hologram recording is performed, generally there is a tendency that, as the number of multiplexed hologram records, the S/N ratio of a hologram reproduction image decreases, and a bad influence may possibly be exerted on the recognition of the markers 24. Particularly at a peripheral portion of the data page 26 as a portion at which a marker 24 is disposed, there is a tendency that also the contrast of the image decreases from an optical reason. The decrease of the contrast and the decrease of the S/N ratio cooperatively make it difficult to recognize a marker 24 with a high degree of accuracy, resulting in degradation in bit error rate.

SUMMARY OF THE INVENTION

It is an object of the present invention to provide a hologram recording and reproduction apparatus, a hologram recording and reproduction method and a hologram recording medium by which, even if the multiplicity in multiplexing of recording data is increased, positioning of data upon reproduction can be performed with a high degree of accuracy without decreasing the recording capacity.

In order to attain the object described above, according to an aspect of the present invention, there is provided a hologram recording apparatus, including an optical system for causing a first light beam spatially optically modulated with recording data to interfere with a second light beam to produce interference fringes to be recorded at a recording spot on a hologram recording medium, and a recording section for recording recording data which include only positioning information to be used for positioning of the data upon reproduction at a recording spot for exclusive use on the hologram recording medium.

In the hologram recording apparatus, recording data which include only positioning information to be used for positioning of data upon reproduction are recorded at a recording spot for exclusive use on a hologram recording medium. Therefore, the multiplicity of the recording data can be set to an optimum value with which good accuracy in recognition of the position information can be achieved upon reproduction. Thus, the positioning information can always be recognized with a high degree of accuracy to obtain positioning information of a high degree of accuracy irrespective of the multiplicity of recording data which do not include the positioning information.

According to another aspect of the present invention, there is provided a hologram recording apparatus, including an optical system for causing a first light beam spatially optically modulated with recording data to interfere with a second light beam to produce interference fringes to be recorded at a recording spot on a hologram recording medium, and a recording section for multiplex recording first recording data which include only positioning information to be used upon data reproduction and second recording data which do not include the positioning information at the same recording spot on the hologram recording medium.

In the hologram recording apparatus, first recording data only for positioning information are recorded together with second recording data which do not include the positioning information. Therefore, the numbers, locations and shapes of positioning information images to be placed in data pages of the first recording data can be set so as to be advantageous for recognition of the positioning information images upon reproduction, and in this regard, the degree of freedom can be increased. Consequently, even if the multiplicity upon recording is raised, recognition of the position information upon reproduction can be performed well.

According to a further aspect of the present invention, there is provided a hologram reproduction apparatus, including a light receiving element for receiving diffracted light generated by illuminating a light beam upon a recording spot on a hologram recording medium on which interference fringes are recorded to read out data from the hologram recording medium, an acquisition section for acquiring positioning information from the data read out from a first recording spot on the hologram recording medium, and a data processing section for positioning data read out from second and succeeding recording spots on the hologram recording medium based on the positioning information to produce reproduction data.

It is guaranteed in principle that, if the same recording drive is used for recording, the relative positions of hologram reproduction images recorded at different recording spots are not displaced from each other. Accordingly, in the hologram reproduction apparatus, if positional displacement occurs with data recorded at first and second recording spots because of aberration of an optical system or the like, then such positional displacement occurs in a similar manner with the first and second recording spots. Consequently, the positional information read out from the first recording spot on the hologram recording medium can be used to perform positioning of data read out from the second recording spots to reproduce the data. If the positioning information read out from the first recording spot has a high degree of accuracy, then positioning of data read out from the second recording spots can be performed with a high degree of accuracy, and reproduction data of high quality having a low error rate can be obtained.

According to a still further aspect of the present invention, there is provided a hologram reproduction apparatus, including a light receiving element for receiving diffracted light generated by illuminating a light beam upon a recording spot on a hologram recording medium on which interference fringes are recorded to read out data from the hologram recording medium, an acquisition section for acquiring positioning information from at least one particular data page in data read out from a recording spot on the hologram recording medium, and a data processing section for positioning bit patterns obtained from remaining data pages other than the particular data page based on the positioning information to produce reproduction data.

In the hologram reproduction apparatus, if only positioning information is recorded on the particular data page, then when the particular data page is read out from a recording spot on the hologram recording medium to recognize positioning information, the positioning information can be recognized without being influenced by any other data. Consequently, the accuracy in recognition of the positioning information can be raised as much. Further, by using the positioning information to perform positioning of bit patterns obtained from the other data pages than the particular data page, the positioning accuracy of the bit patterns can be raised to obtain reproduction data of high quality.

According to a yet further aspect of the present invention, there is provided a hologram recording method, including the steps of causing a first light beam spatially optically modulated with recording data to interfere with a second light beam, and recording interference fringes generated by the interference at a recording spot on a hologram recording medium, the recording step including a step of recording only recording data which include only positioning information to be used to position data upon reproduction on a recording spot for exclusive use on the hologram recording medium.

In the hologram recording method, first recording data which include only positioning information to be used for positioning of data upon reproduction are recorded at a recording spot for exclusive use on a hologram recording medium. Therefore, the first recording data can be recorded in an optimum condition (multiplicity or the like) with which good accuracy in recognition of the position information for positioning of data upon reproduction can be achieved. Accordingly, upon reproduction, the positioning information can always be recognized with a high degree of accuracy irrespective of the multiplicity of recording data which do not include the positioning information.

According to an additional aspect of the present invention, there is provided a hologram recording method, including the steps of causing a first light beam spatially optically modulated with recording data to interfere with a second light beam, and recording interference fringes generated by the interference at a recording spot on a hologram recording medium, the recording step including a step of multiplex recording first recording data which include only positioning information to be used upon data reproduction and second recording data which do not include the positioning information at the same recording spot on the hologram recording medium.

In the hologram recording method, first recording data only for positioning information are recorded together with second recording data which do not include the positioning information. Therefore, the numbers, locations and shapes of positioning information images to be placed in data pages of the first recording data can be set so as to be advantageous for recognition of the positioning information images upon reproduction, and in this regard, the degree of freedom can be increased. Consequently, even if the multiplicity upon recording is raised, recognition of the position information upon reproduction can be performed well.

According to another additional aspect of the present invention, there is provided a hologram reproduction method, including the steps of causing a light receiving element to receive diffracted light generated by illuminating a light beam upon a recording spot on a hologram recording medium on which interference fringes are recorded to read out data from the hologram recording medium, acquiring positioning information from the data read out from a first recording spot on the hologram recording medium, and positioning data read out from second and succeeding recording spots on the hologram recording medium based on the positioning information to produce reproduction data.

It is guaranteed in principle that, if the same recording drive is used for recording, the relative positions of hologram recording data recorded at different recording spots are not displaced from each other in a direction on a plane of a hologram recording medium. Accordingly, in the hologram reproduction method, if positional displacement occurs with recording data recorded at first, second and succeeding recording spots by some cause, then such positional displacement occurs in a similar manner with the first, second and succeeding recording spots. Consequently, the positional information read out from the first recording spot on the hologram recording medium can be used to perform positioning of data read out from the second recording spot to reproduce the data. If the positioning information read out from the first recording spot has a high degree of accuracy, then positioning of data read out from the second and succeeding recording spots can be performed with a high degree of accuracy, and reproduction data of high quality having a low error rate can be obtained.

According to a further additional aspect of the present invention, there is provided a hologram reproduction method, including the steps of causing a light receiving element to receive diffracted light generated by illuminating a light beam upon a recording spot on a hologram recording medium on which interference fringes are recorded to read out data from the hologram recording medium, acquiring positioning information from at least one particular data page in data read out from a recording spot on the hologram recording medium, and positioning bit patterns obtained from remaining data pages other than the particular data page based on the positioning information to produce reproduction data.

In the hologram reproduction method, if only positioning information is recorded on the particular data page, then when the particular data page is read out from a recording spot on the hologram recording medium to recognize positioning information, the positioning information can be recognized without being influenced by any other data. Consequently, the accuracy in recognition of the positioning information can be raised as much. Further, by using the positioning information to perform positioning of bit patterns obtained from the other data pages than the particular data page, the positioning accuracy of the bit patterns can be raised to obtain reproduction data of high quality.

According to a still further additional aspect of the present invention, there is provided a hologram recording medium on which interference fringes generated by causing a first light beam spatially optically modulated with recording data to interfere with a second light beam are to be recorded, having a recording spot for exclusive use at which only recording data which include only positioning information to be used upon data are to be recorded.

With the hologram recording medium, recording data including only positioning information to be used for positioning of data upon reproduction can be recorded in an optimum condition with which good accuracy in recognition of the position information can be achieved upon reproduction. Consequently, the positioning information reproduced from a recording spot for exclusive use can be recognized with a high degree of accuracy. If the positioning information is used to perform positioning of data read out from the other recording spots, then the positioning can be performed with a high degree of accuracy, and reproduction data of high quality having a low error rate can be obtained.

According to a yet further additional aspect of the present invention, there is provided a hologram recording medium on which interference fringes generated by causing a first light beam spatially optically modulated with recording data to interfere with a second light beam are to be recorded, having a spot at which first recording data which include only positioning information to be used upon data reproduction and second recording data which do not include the positioning information are to be recorded together.

In the hologram recording medium, first recording data only for positioning information are recorded together with second recording data which do not include the positioning information. Therefore, the numbers, locations and shapes of positioning information images to be placed in data pages of the first recording data can be set so as to be advantageous for recognition of the positioning information images upon reproduction, and in this regard, the degree of freedom can be increased. Consequently, even if the multiplicity upon recording is raised, recognition of the position information upon reproduction can be performed well.

In summary, with the hologram recording apparatus, hologram reproduction apparatus, hologram recording methods, hologram reproduction methods and hologram recording media, recording data which include only positioning information to be used for positioning of data upon reproduction are recorded at a recording spot for exclusive use on a hologram recording medium. Further, the positioning information read out from the recording spot for exclusive use on the hologram recording medium is used to perform positioning of data read out from the other recording spots on the hologram recording medium. Consequently, even if the multiplicity upon recording is raised, positioning of data upon reproduction can be performed always with a high degree of accuracy without decreasing the recording capacity, and reproduction data of high quality having a low error rate an be obtained.

Further, with the hologram recording apparatus, hologram reproduction apparatus, hologram recording methods, hologram reproduction methods and hologram recording media, first recording data only for positioning information are recorded together with second recording data which do not include the positioning information. Therefore, the numbers, locations and shapes of positioning information images to be placed in data pages of the first recording data can be set so as to be advantageous for recognition of the positioning information images upon reproduction, and in this regard, the degree of freedom can be increased. Consequently, even if the multiplicity upon recording is raised, positioning of data upon reproduction can be performed always with a high degree of accuracy without decreasing the recording capacity, and reproduction data of high quality having a low error rate can be obtained.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

In the preferred embodiments of the present embodiment described below, even if the multiplicity of recording data is raised, positioning of data upon reproduction can be performed with a high degree of accuracy without decreasing the recording capacity. To this end, data including only positioning information are recorded at a recording spot for exclusive use on a hologram recording medium. Then, upon reproduction, the positional information acquired from read out from the recording spot for exclusive use is used to perform positioning of data read out from the other recording spots on the hologram recording medium to reproduce data on the hologram recording medium. Detailed description of the embodiments is given blow.

Embodiment 1

Figure 1:
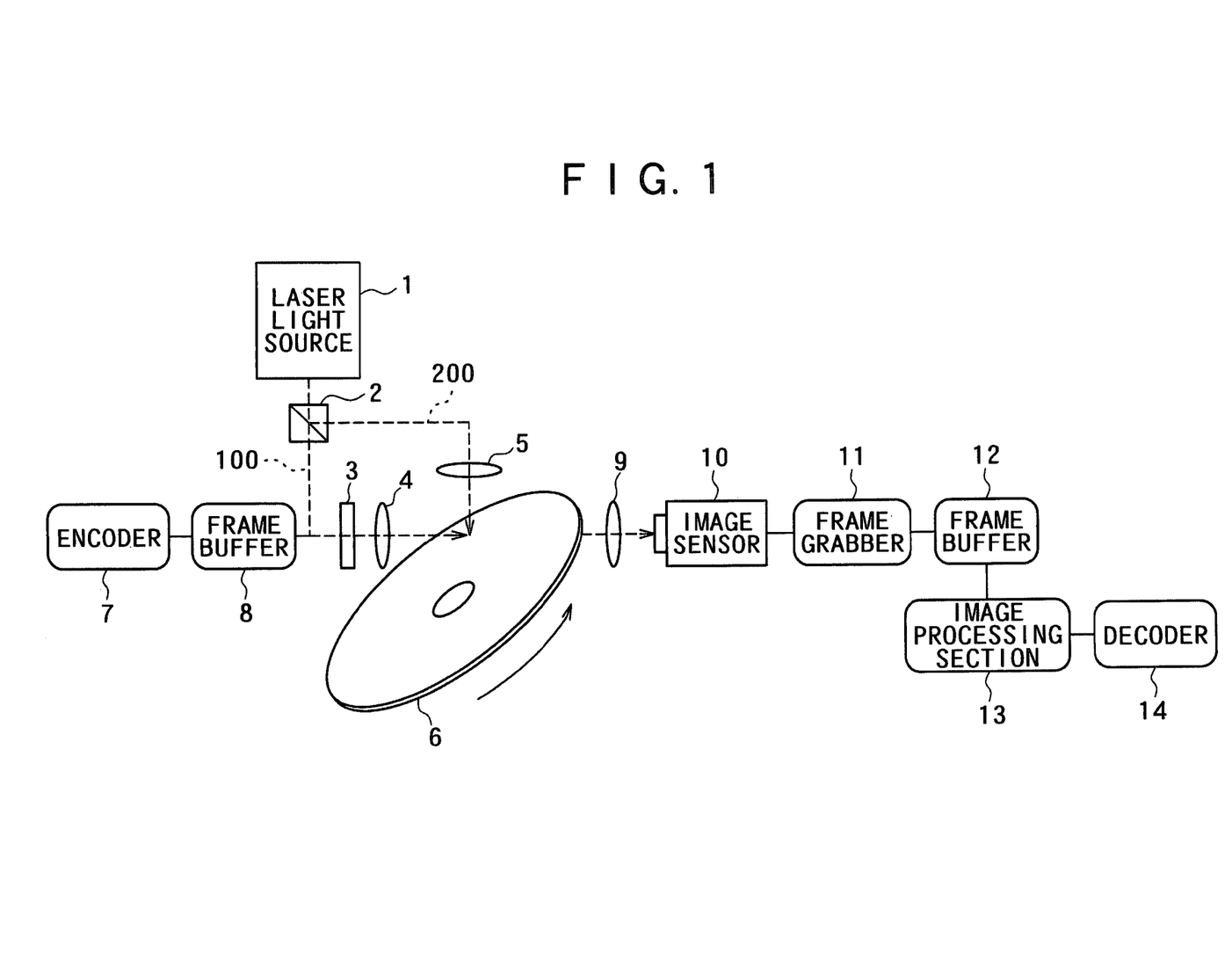
FIG. 1 is a schematic block diagram of a hologram recording and reproduction apparatus to a first embodiment of the present invention.

Referring FIG. 1, there is shown a general configuration of a hologram recording and reproduction apparatus according to a first embodiment of the present invention. The hologram recording and reproduction apparatus includes a laser light source 1, a beam splitter 2, a spatial light modulator 3, a lens (Fourier lens) 4, another lens 5, and a hologram recording medium 6. The hologram recording and reproduction apparatus further includes an encoder 7, a frame buffer 8, a lens (inverse Fourier lens) 9, an image sensor 10, a frame grabber 11, a frame buffer 12, an image processing section 13, and a decoder 14.

Operation of the hologram recording and reproduction apparatus is described below. Recording data of an image and so forth undergo, for example, $2/3$ block modulation by the encoder 7 and then stored for each data page into the frame buffer 8 once. A data page read out from the frame buffer 8 in accordance with a timing for recording is displayed on the spatial light modulator 3. Meanwhile, a coherent laser beam emitted from the laser light source 1 is introduced into the beam splitter 2, by which the laser beam is split into signal light (first light beam) 100 and reference light (second light beam) 200. The signal light 100 is introduced to the spatial light modulator 3 through a signal optical system (not shown) and undergoes spatial light modulation (amplitude modulation) by the spatial light modulator 3 on which the data page is displayed. The modulated signal light is condensed on the hologram recording medium 6 by the lens 4.

Meanwhile, the reference light 200 is illuminated on the hologram recording medium 6 through a reference optical system (not shown) and the lens 5. Consequently, the signal light 100 and the reference light 200 are superposed with each other in the hologram recording medium 6 to form interference fringes, and the interference fringes are recorded as a fine density pattern on the hologram recording medium 6.

In order to reproduce data recorded on the hologram recording medium 6, illumination light same as the reference light 200 is introduced to the hologram recording medium 6. Consequently, the data are reproduced as diffracted light corresponding to the interference fringes recorded on the hologram recording medium 6, and the diffracted light is condensed by the frame grabber 11 on and received by the image sensor 10, which may be a CCD image sensor or a CMOS image sensor. A digital or analog image signal outputted from the image sensor 10 is image formatted for each frame by the frame grabber 11, and the image formatted data page is stored into the frame buffer 12. Thereafter, the image processing section 13 performs positioning of the data page read out from the frame buffer 12 using positioning information hereinafter described. The data page for which the positioning is completed is demodulated by the decoder 14 to restore original image data, and the original image data are outputted.

Figure 2:
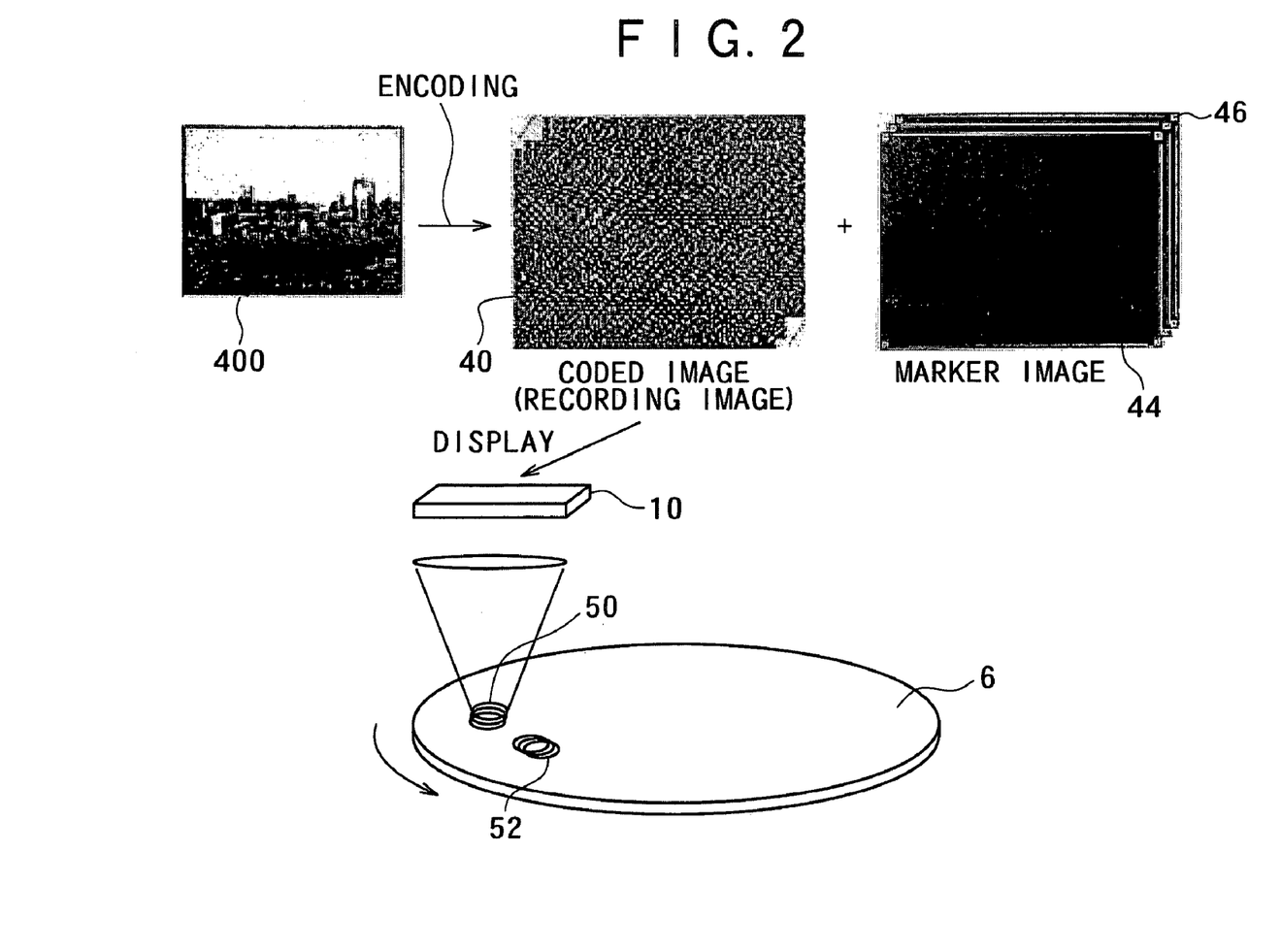
FIG. 2 is a schematic view illustrating a method of recording a hologram using the apparatus shown in FIG. 1.
Figure 3A:
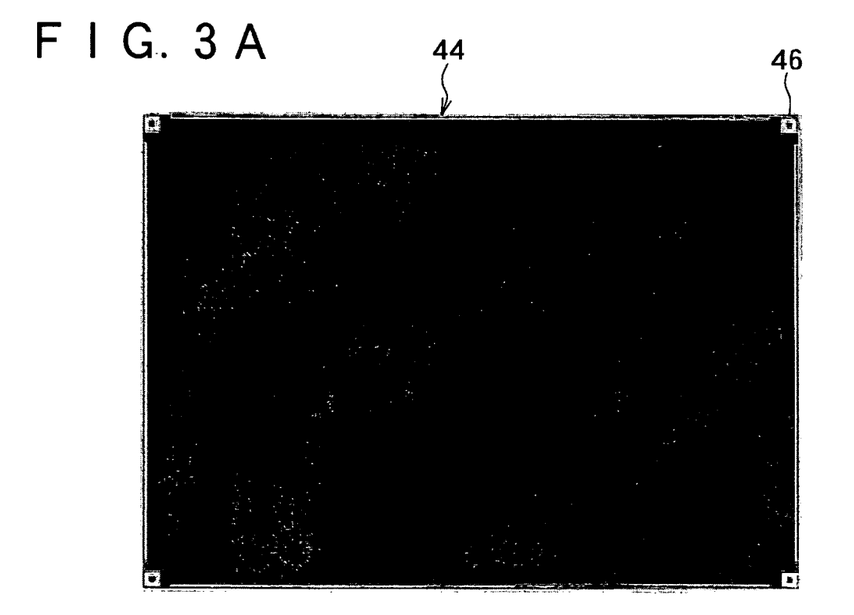
FIGS. 3A and 3B are views showing details of a recording data page and marker data page, respectively, shown in FIG. 2.
Figure 3B:
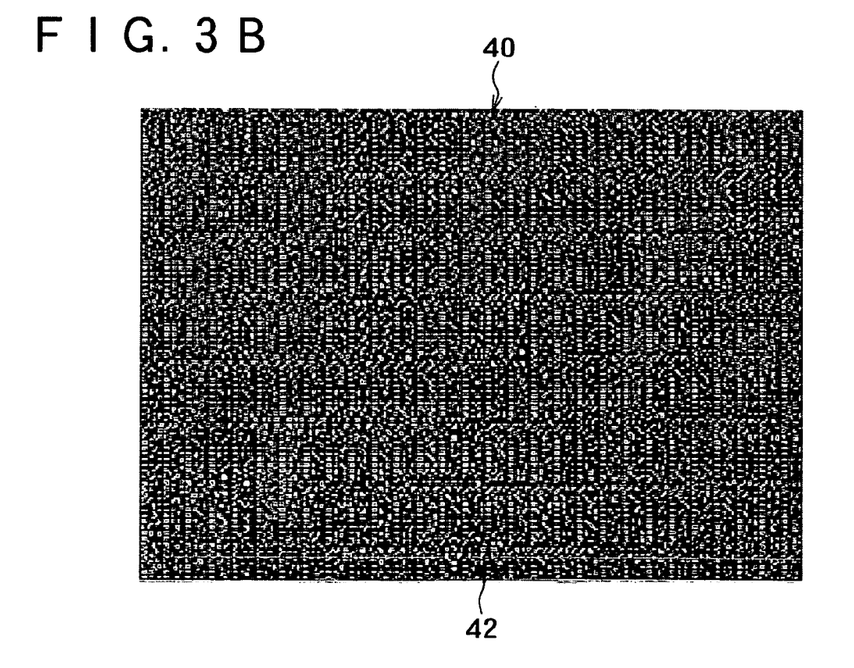

A recording method of a data page to be recorded on the hologram recording medium 6 is described with reference to FIG. 2. Image data 400 to be recorded by the hologram recording and reproduction apparatus are encoded into a coded image for recording (recording data page 40). The recording data page 40 is formed only from a two-dimensional bit pattern 42 as seen in FIG. 3B and includes no marker for positioning. Accordingly, in the present embodiment, markers 46 for positioning are formed as a marker data page 44, which merely includes markers 46, for example, at the four corners as seen in FIG. 3A but does not include any bit pattern.

N such recording data pages 40 are involved and are displayed one by one on the spatial light modulator 3. After signal light is spatially modulated by a data page displayed in this manner, the signal light is condensed at a hologram recording spot (hereinafter referred to simply as recording spot) 50 on the hologram recording medium 6. Thereupon, an interference fringe of the signal light and the reference light illuminated separately is recorded at the recording spot 50. Every time the data page displayed on the spatial light modulator 3 changes, the hologram recording medium 6 is rotated a little in the direction indicated by an arrow mark so that another interference fringe of modulated signal light is recorded, for example, in a shift multiplex system. It is to be noted that the recording system is not limited to the shift multiplex system, but an angle multiplex system, a phase multiplex system or the like may be used.

Figure 4:
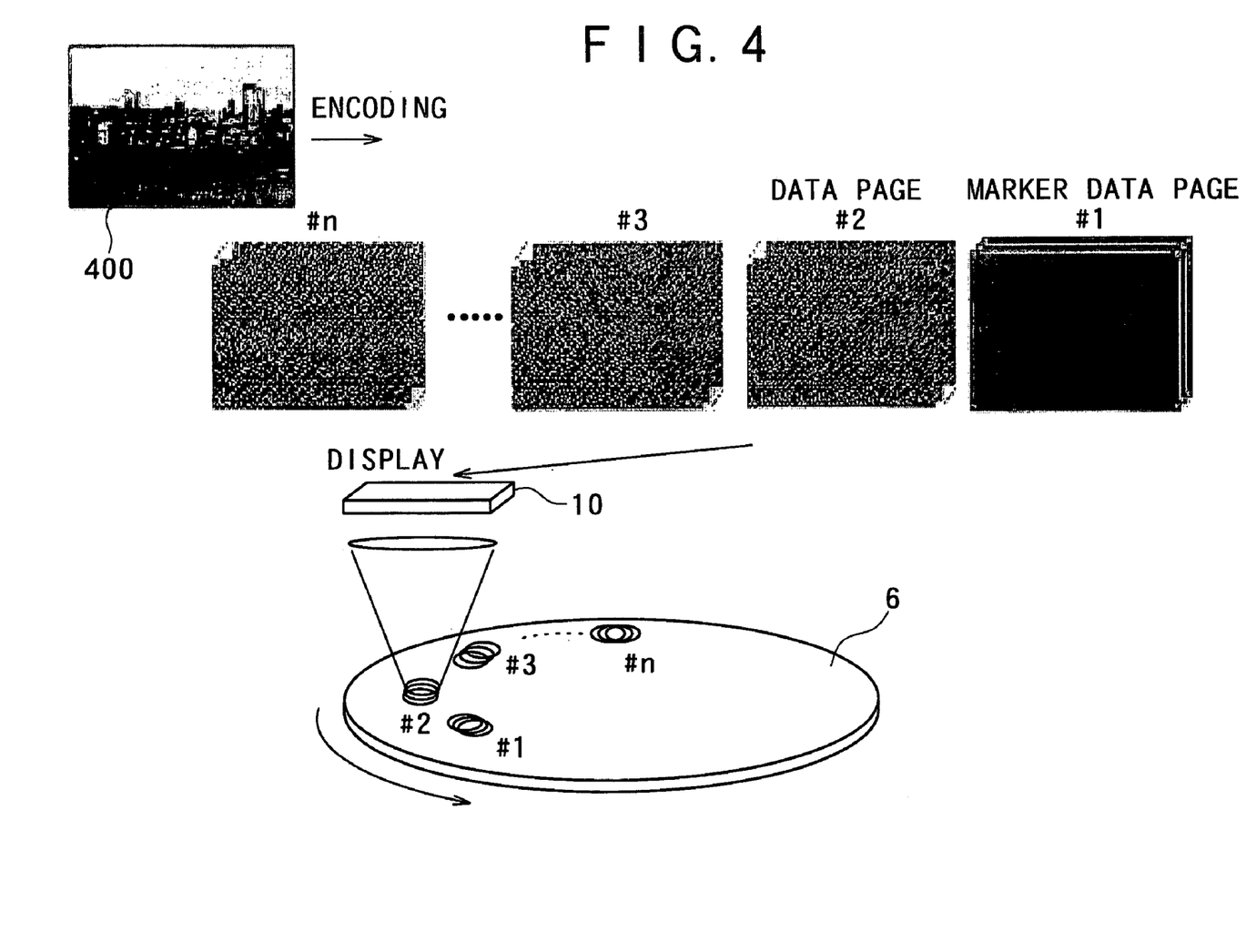
FIG. 4 is a schematic view illustrating a manner wherein a marker data page is recorded at marker recording spot and recording data pages are recorded at a plurality of succeeding recording spots.

Meanwhile, usually a plurality of (M) marker data pages 44 are produced. The marker data pages 44 are displayed one by one on the spatial light modulator 3 similarly to the recording data pages 40 described above but at another timing, and a displayed one of the marker data pages 44 is recorded at a marker hologram recording spot (hereinafter referred to merely as marker recording spot) 52 on the hologram recording medium 6 by a shift multiplex system. It is to be noted that the numbers N and M of the recording data page 40 and the marker data page 44 normally have a relationship of N>M, and therefore, the multiplicity of the marker data pages 44 is lower than that of the recording data pages 40. Usually, M is a comparatively small fixed number while N is 100 to 200 or so. Also the recording system for marker data pages is not limited to the shift multiplex system similarly as in recording of data pages. The present invention can be effectively applied also to a system wherein a spot is changed in a fixed multiplex number to perform recording such as an angle multiplex system or a phase multiplex system. In this instance, such a recording mode as illustrated in FIG. 4 is used. Referring to FIG. 4, marker data pages denoted by #1 are recorded at marker recording spots denoted by #1, and recording data pages denoted by #2, #3, ..., #n are recorded at succeeding recording spots denoted by #2, #3, ..., #n, respectively. Upon reproduction, position information detected from markers read from the marker recording spot #1 is used to allow positioning of bit patterns read from the recording spots #2, #3, ..., #n unless the recording drive changes.

A method of reproducing data where the recording data pages 40 and the marker data pages 44 are recorded separately on a hologram recording medium 6 as described hereinabove is described. Upon reproduction, illumination light same as the reference light 200 is illuminated on the marker recording spot 52 of the hologram recording medium 6, and resulting diffracted light is received by the image sensor 10 through the lens 9. An image signal obtained from the image sensor 10 is image formatted by the frame grabber 11 and inputted to the image processing section 13 through the frame buffer 12. The image processing section 13 recognizes the markers 46 from the image formatted data page and detects and stores positional displacement between the received light positions of the markers 46 on the image sensor 10 and light receiving pixels of the image sensor 10 by which light should originally be received as positional displacement (positioning information) of the bit pattern 42.

It is to be noted that, since several position marker data pages 44 are recorded in a multiplexed form, the image processing section 13 reads out all of the marker data pages 44 and produces an image by addition and averaging in pixel trains of the marker data pages 44 or the like and then uses to the image to recognize the markers 46. Consequently, a miss of some marker 46 caused by a defect of the hologram recording medium 6 or the like can be prevented, and recognition of the markers 46 can be performed with a high degree of accuracy and certainty.

Then, illumination light same as the reference light 200 is illuminated on the recording spot 50 on the hologram recording medium 6, and resulting diffracted light is received by the image sensor 10 through the lens 9. The received light signal obtained by the image sensor 10 is image formatted by the frame grabber 11 and inputted to the image processing section 13 through the frame buffer 12. The image processing section 13 performs positioning of the bit pattern 42 inputted from the image sensor 10 based on the positioning information of the bit pattern 42 detected formerly so that the original recording data page may be reproduced accurately. Thus, the image processing section 13 outputs the data page re-constructed so as to correspond accurately to the original recording data page to the decoder 14.

Figure 5A:
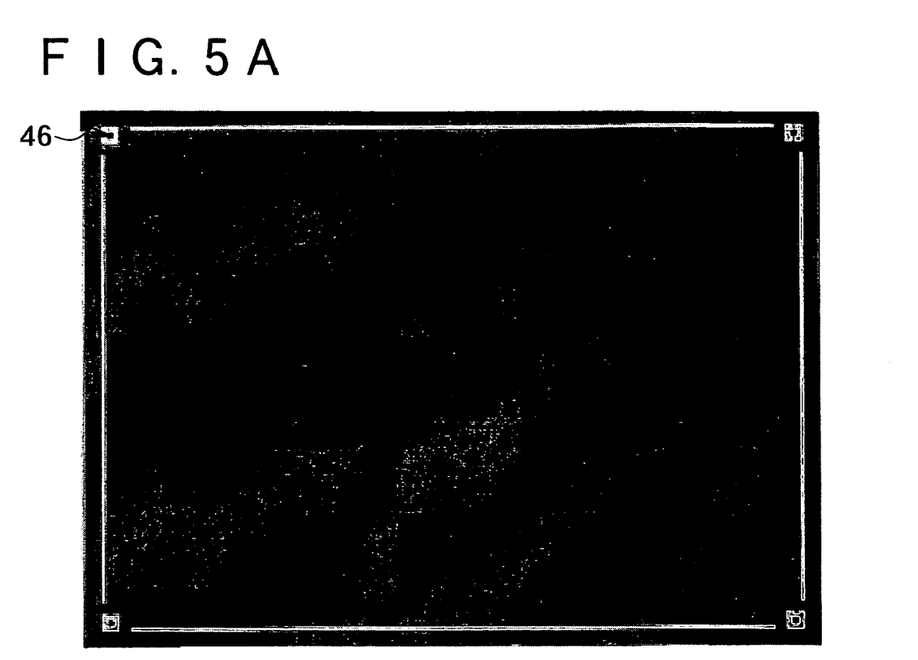
FIGS. 5A and 5B are views illustrating a method of performing positioning of a bit pattern using position information detected by recognition of markers.
Figure 5B:
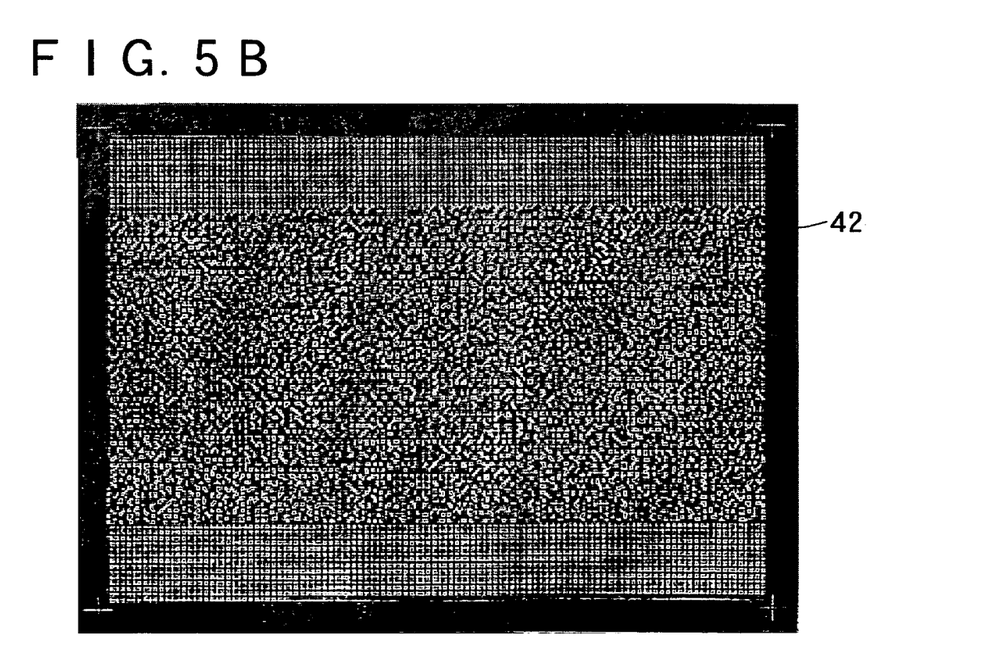
Figure 6A:
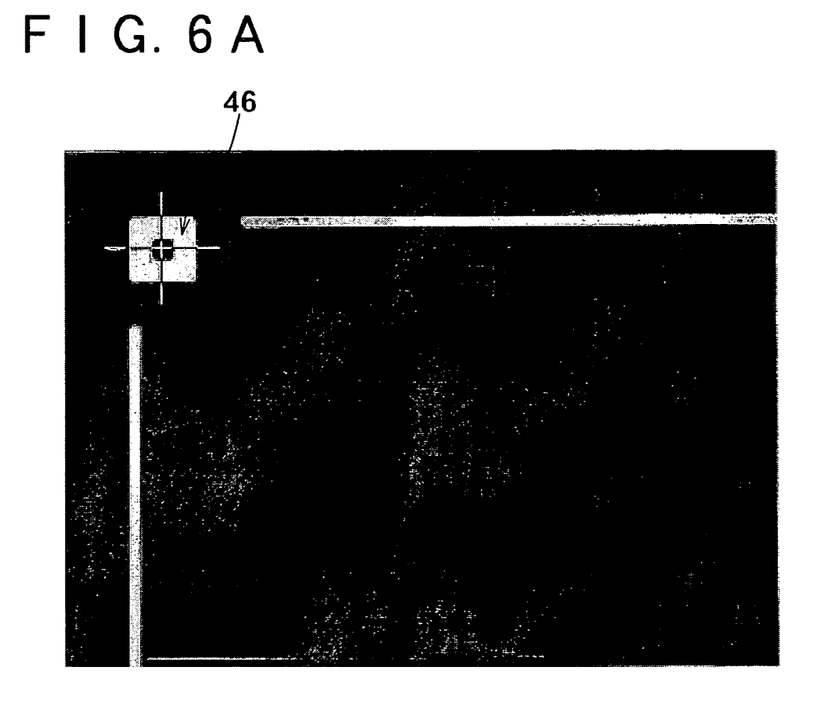
FIGS. 6A and 6B are enlarged views of part of FIGS. 5A and 5B, respectively.
Figure 6B:
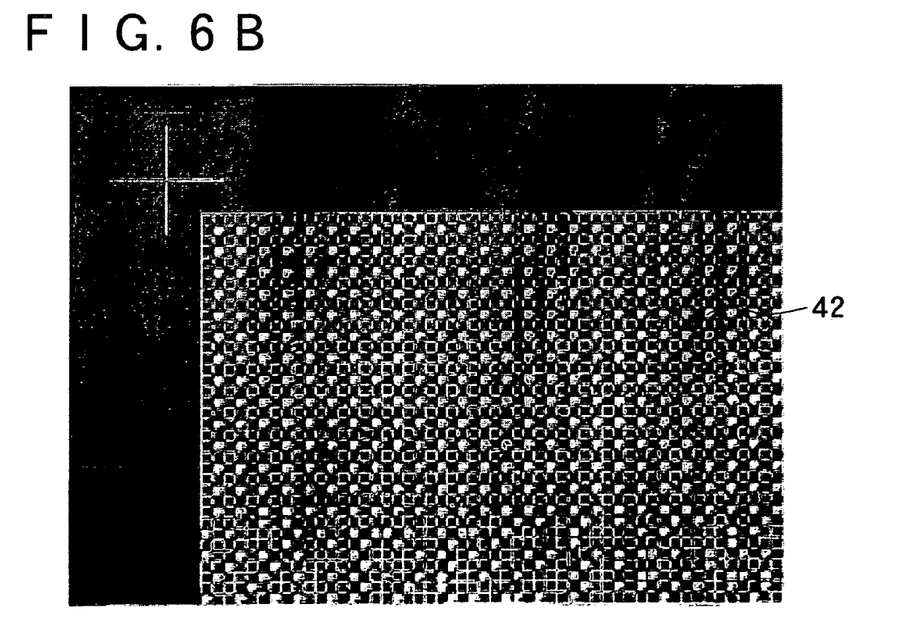

More particularly, it is assumed that, although the image sensor 10 is set such that modulated light emitted from a modulation pixel in the ith row and jth column in the modulation region of the spatial light modulator 3 is received by a light receiving element in the Ith row and Jth column in the light receiving region of the image sensor 10, the light is received by a pixel in the I'th row in the J'th column as a result of positional displacement. In this instance, the position of the I'th row and J'th column is specified from the positional displacement information described hereinabove, and the received light signal from the light receiving pixel at the position is thereafter treated as a received light signal from the pixel at the Ith row and Jth column. As a result, a reproduced data page corresponding accurately to original recording data can be obtained. A manner of positioning is illustrated in FIGS. 5A and 5B and FIGS. 6A and 6B which are enlarged views of part of FIGS. 5A and 5B, respectively. As seen from FIGS. 5A and 6A, a marker is recognized from a hologram image in which the marker is recorded to detect the position of the marker. The position information of the marker is used to perform positioning of a bit pattern from a hologram image on which such a bit pattern 42 as shown in FIGS. 5B and 6B is recorded and then perform cutting out of data bits.

It is to be noted that it is guaranteed in principle that, even if the positioning marker recording spot 52 and the recording data recording spot 50 are different from each other on the hologram recording medium 6, if the same drive is used for recording, then the positions of them are not displaced in position from each other on a projection plane (image plane) of hologram reproduction images recorded on different recording spots. Accordingly, if positional displacement occurs with recording data of the recording spots 50 and 52 because of aberration of the optical system or the like, then such positional displacement occurs in a similar manner, and the positional displacement of image data reproduced from the recording spot 50 can be corrected with certainty using the positional displacement information based on the markers 46 reproduced from the marker recording spot 52.

Where relating information of the markers 46 recorded at the marker recording spot 52 and the recording data recorded at the recording spot 50 is recorded on the hologram recording medium 6 upon recording, the relating information can be referred to upon reproduction to specify the markers 46 for performing positioning of the reproduction data. At this time, where the relating information is recorded on the same page as the data page which includes the positioning information, the relating information is recorded as a hologram at the positioning marker recording spot 52 or a data page which includes only the relating information is recorded as a hologram at a recording spot for exclusive use.

Also it is possible to record the relating information on a data page for ordinary data or record the data page including only the relating information at the recording spot 50 for recording data.

However, if the relating information is multiplex recorded in the same density as ordinary data, then there is the possibility that it may not be read out because of noise or the positioning accuracy. Therefore, it is preferable to reduce the recording capacity per one page only on the page on which the recording information is recorded to perform recording with an increased tolerance. Therefore, usually the relating information is preferably recorded by one of the two former methods.

Further, such relating information need not be provided by the following measure. In particular, the marker recording spot 52 at which a marker 46 is recorded is positioned at the top of the recording spot 50 at which recording data for performing positioning of reproduction data using the marker 46 are recorded. Then, upon reproduction, if a marker 46 is reproduced, then data reproduced later are all positioned using the marker 46. Thereafter, if another marker 46 is reproduced, then succeeding reproduced data are positioned using the marker 46.

It is to be noted that, where the drive to be used is fixed in advance and another drive is not used, such a method can be taken that such relating information as described above is stored into the image processing section 13 upon recording and, upon reproduction, the relating information is referred to specify a marker 46 to be used for positioning of reproduction data.

According to the present embodiment, since the recording spots 50 and 52 for the recording data pages 40 and the marker data pages 44 are set to different places, the recording multiplicity of the marker recording spot 52 at which the markers 46 are to be recorded can be reduced. Besides, by performing addition and averaging or the like of a plurality of marker data pages 44 obtained by reproduction to recognize the markers 46, the markers 46 can be recognized with a high degree of accuracy and certainty. Consequently, positioning information of a high degree of accuracy can be acquired from the markers 46.

Accordingly, if the positioning information of a high degree of accuracy is used, then even if the multiplicity of the recording data pages 40 is increased, positioning of a recording data page 40 read out from the marker recording spot 52 can be performed accurately and reproduction data of good quality can be obtained. Besides, when it is tried to raise the multiplicity of image data to be recorded at the recording spot 50, recognition of a marker image upon reproduction need not be taken into consideration but the multiplicity of image data can be determined only from the limit to the recording data reproduction. Consequently, the recording multiplicity of data can be raised to increase the recording density when compared with that where the data page 26 shown in FIG. 10 is used.

Further, for example, if a recording data page 40 is in a block modulated form when it is to be recorded, then even if the multiplicity of the recording data pages 40 upon recording is raised considerably and this results in considerable degradation of the image quality upon reproduction, if such positioning information of a high degree of accuracy as described above is available, then the position of an image block upon reproduction can be identified. Consequently, for example, where a ⅔ modulation code is used, image data can be decoded accurately by determining the position of a portion of the block at which the block indicates the highest brightness. Although various modulation systems are applicable, whichever one of them is used, where position information of a high degree of accuracy is available, image data of a high degree of accuracy can be decoded by the modulation even if the quality of a reproduction image is poor.

Further, since a marker data page 44 is involved, an arbitrary number of markers 46 of a suitable form can be placed at arbitrary locations of the marker data page 44, and the degree of freedom in design of data pages for exclusive use for markers can be raised and one of the data pages for exclusive use for markers which has a design which exhibits the highest marker recognition rate upon reproduction can be used.

It is to be noted that, in the embodiment described above, upon recording of data, markers 46 and a bit pattern 42 are recorded always in combination, and upon reproduction, positioning of a bit pattern 42 upon reproduction is performed using markers 46 recorded in combination with the bit pattern 42. Accordingly, even when recording on the same hologram recording medium 6 is performed, if the recording drive is changed, then there is the possibility that the recorded position of the bit pattern 42 may vary. Therefore, it is necessary to record markers 46 newly together with recording of a new bit pattern 42.

Embodiment 2

Figure 7:
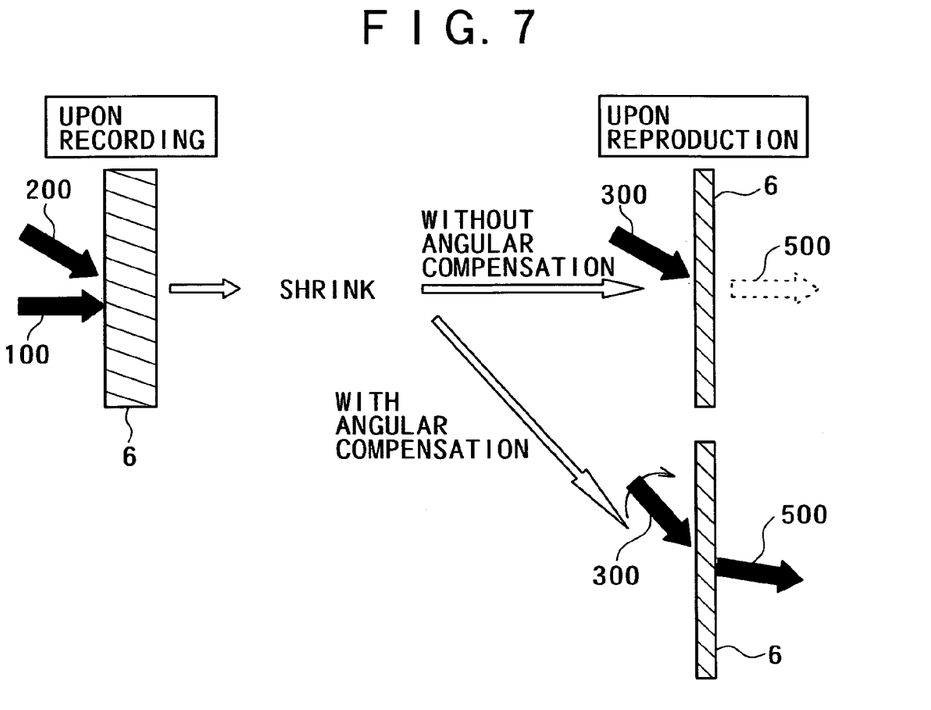
FIG. 7 is a schematic view illustrating a hologram reproduction method according to a second embodiment of the present invention.

FIG. 7 illustrates a hologram reproduction method according to a second embodiment of the present invention. The hologram reproduction method of the present second embodiment is carried out by the same hologram recording and reproduction apparatus as that of the first embodiment described above. Thus, only characteristic portions of the hologram reproduction method are described below. The hologram reproduction method of the present embodiment is applied particularly where the material of a hologram recording medium exhibits shrinkage.

In such a case that the material of the hologram recording medium 6 exhibits shrinkage, the incident angle of illumination light 300 upon reproduction is sometimes changed with respect to the incident angle of reference light 200 upon recording, and this is called angular compensation. The shrinkage changes the thickness of the material upon reproduction from that upon recording, and this sometimes makes the situation of interference fringes recorded on the hologram recording medium 6 different from that upon recording. In such an instance, if the illumination light 300 upon reproduction is illuminated at an angle equal to that of the reference light 200 (that is, without any angular compensation), then the Bragg matching condition between the illumination light 300 and the interference fringes is lost and the intensity of diffracted light (reproduced light) 500 generated becomes weak. Therefore, the incident angle of the illumination light 300 to the hologram recording medium 6 is changed (that is, with angular compensation) by means of a driving mechanism or an optical element not shown so that the diffracted light 500 may be generated.

For example, referring to FIG. 7, it is assumed that, after reference light 200 upon recording is introduced at an angle θ to the hologram recording medium 6 to record a hologram on the hologram recording medium 6, the hologram recording medium 6 shrinks. In such an instance, the incident angle of the illumination light 300 upon reproduction is set to θ to effect angular compensation so that diffracted light 500 of an ordinal level is obtained.

Figure 8:
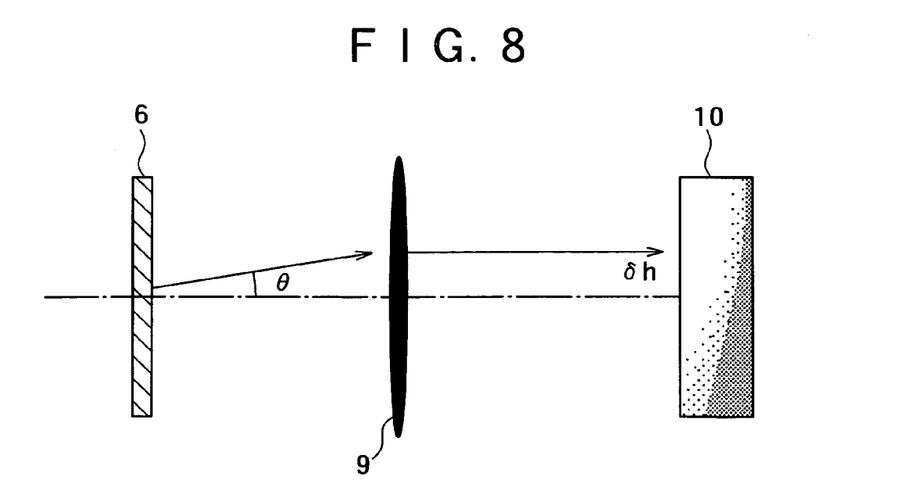
FIG. 8 is a schematic view illustrating positional displacement on an image sensor where angular compensation is applied to illuminating light.

The angle for angular compensation can be determined not only theoretically but also experimentally by changing the angle of the illumination light 300. If the angular compensation is performed, then while also the angle of the diffracted light 500 changes, the changing amount of the angle and the compensation angle of the angular compensation angle have a fixed relationship. In particular, the compensation angle of the angular compensation is known, and the reproduction light angle can be calculated from the compensation angle. As seen in FIG. 8, the positional displacement δh on the image sensor 10 can be calculated from the reproduction light angle in accordance with $\delta h = f \cdot \tan \theta$, where f is the focal length of the lens 9.

Where angular compensation is involved in this manner and the compensation angle differs among different recording pages, it can be recognized that the position of a positioning mark moves on an image obtained. However, since the amount of movement (relative displacement in position) can be calculated in advance, if the image processing section 13 uses the calculated value to correct position information obtained from the position of a positioning mark, then even if positional displacement appears between recording pages on the image sensor 10, a technique similar to that which is applied where no angular compensation is involved can be used. Thus, positioning of a data page read out from an ordinary recording spot with positioning information read out from a recording spot for exclusive use for markers can be performed accurately similarly as in the first embodiment.

It is to be noted that, where the shrinkage of the hologram recording medium 6 is sufficiently small and there is no necessity to perform angular compensation of the reference light 200, since positional displacement for a recording page on the image sensor 10 does not occur, naturally there is no necessity to perform the correction process with the calculated value.

Embodiment 3

Figure 9:
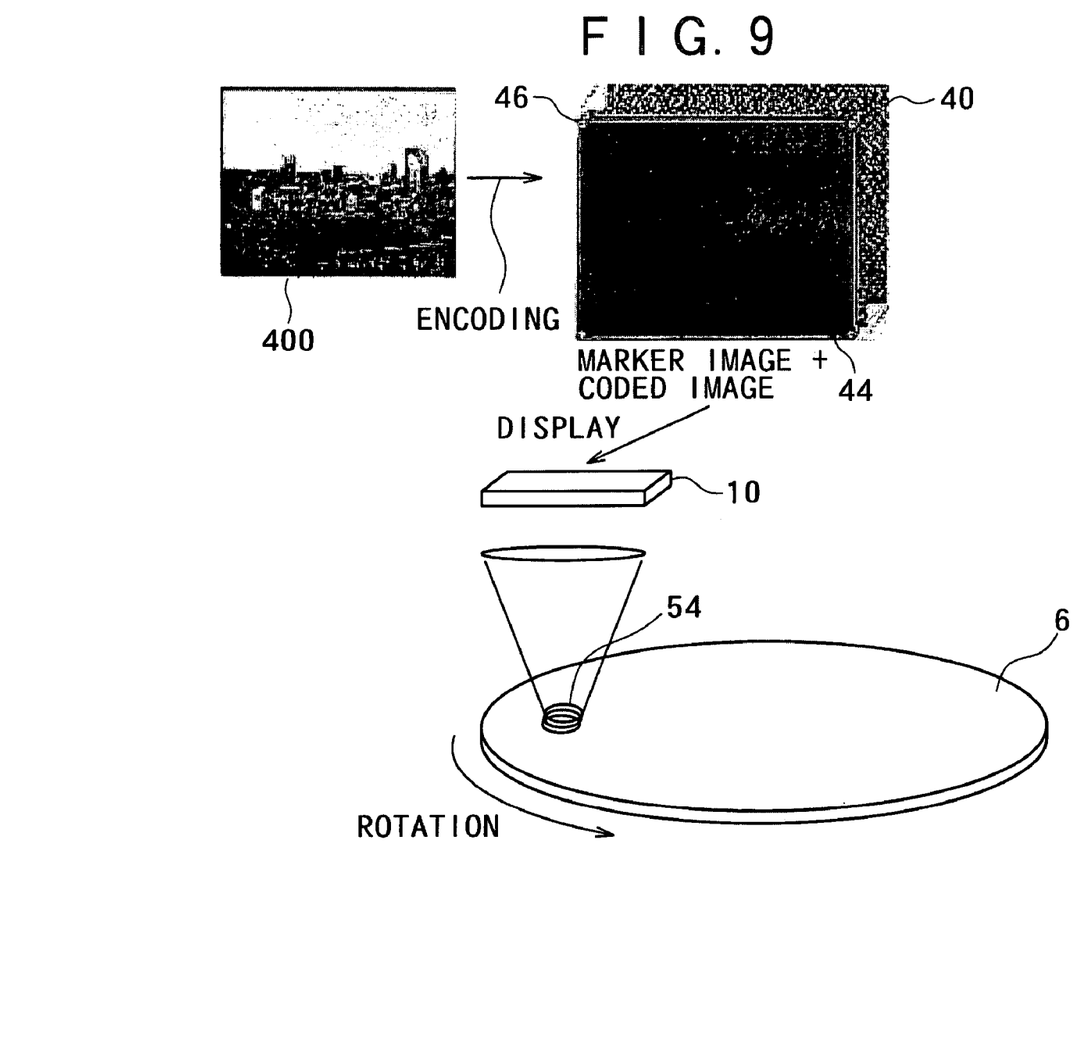
FIG. 9 is a schematic view illustrating a hologram recording method according to a third embodiment of the present invention.

FIG. 9 is a schematic view illustrating a further hologram recording method according to a third embodiment of the present invention. The hologram reproduction method of the present third embodiment is carried out on the same hologram recording and reproduction apparatus as that in the first embodiment described above. Thus, only characteristic portions of the hologram reproduction method are described below. In the present embodiment, the marker data pages 44 for positioning and the recording data pages 40 for recording are separate from each other similarly as on the first embodiment and have similar configurations to those in the first embodiment. However, the present embodiment is different from the first embodiment in that both of the marker data pages 44 and the recording data pages 40 are multiplex recorded together with each other at the same recording spot 54 on the hologram recording medium 6.

In the present embodiment, since the marker data pages 44 and the recording data pages 40 are separate from each other, even if the hologram recording multiplicity is raised, the recognition accuracy of the markers 46 upon reproduction is not likely to drop and positioning information of a high degree of accuracy can be obtained. Consequently, even if the recording density is raised, accurate reproduction data corresponding to original recording data can be obtained.

Further, since the marker data pages 44 for exclusive use for markers are involved, an arbitrary number of markers 46 of a suitable shape can be placed at arbitrary locations of each marker data page 44 to raise the recognition, rate of the markers 46 upon reproduction. Consequently, the hologram recording multiplicity can be raised to achieve improvement of the recording density as much.

While preferred embodiments of the present invention have been described using specific terms, such description is for illustrative purposes only, and it is to be understood that changes and variations may be made without departing from the spirit or scope of the following claims.

What is claimed is:

1. A hologram recording apparatus, comprising:
   an optical system configured to cause a first light beam spatially optically modulated with content data to interfere with a second light beam to produce interference fringes to be recorded at a recording spot on a hologram recording medium; and
   a recording section configured to record positioning information to be used for positioning reproduced content data at a recording spot for exclusive use on the hologram recording medium, the positioning data being provided on the recording medium at a different location and at a different time than the content data.

2. A hologram recording apparatus according to claim 1, wherein said recording section records the positioning information in a multiplexed state at the recording spot on the hologram recording medium.

3. A hologram recording apparatus according to claim 2, wherein a number of pages of the positioning information is lower than a number of pages of the content data which do not include the positioning information.

4. A hologram recording apparatus according to claim 2, wherein the positioning information is recorded as a two-dimensional bit pattern in a predetermined number of data pages.

5. A hologram recording apparatus according to claim 1, wherein the positioning information includes relating information for specifying the other recording spots on the hologram recording medium which are positioned using the positioning information.

6. A hologram recording apparatus according to claim 1, wherein said recording section is configured to record the content data, which include only relating information for specifying the other recording spots on the hologram recording medium which is positioned using the positioning information, at the recording spot for exclusive use on the hologram recording medium.

7. A hologram recording method, comprising the steps of:
   causing a first light beam spatially optically modulated with content data to interfere with a second light beam; and
   recording interference fringes generated by the interference at a recording spot on a hologram recording medium;

the recording step including a step of recording positioning information to be used to position data upon reproduction on a recording spot for exclusive use on the hologram recording medium at a different location and at a different time than the content data which do not include position information.

8. A hologram recording medium on which interference fringes generated by causing a first light beam spatially optically modulated with content data to interfere with a second light beam are to be recorded, comprising:

a first recording spot for exclusive use at which positioning information to be used upon data reproduction are recorded; and a second recording spot at which only content data which do not include the position information are recorded, wherein the first recording spot and second recording spot are recorded at different locations and at a different time.

* * * * *